Dec. 3, 1968  R. BINDER ETAL  3,414,101
DRIVEN CLUTCH PLATE WITH FLEXIBLE CENTER
Filed Nov. 16, 1966  5 Sheets-Sheet 1

INVENTORS
Richard Binder
Peter Geibel
By: Low and Beeman
Agents

INVENTORS
Richard Binder
Peter Geibel
By: Row and Berman
Agents

INVENTORS
Richard Binder
Peter Geibel
By: Row and Berman
Agents

United States Patent Office 3,414,101
Patented Dec. 3, 1968

---

3,414,101
DRIVEN CLUTCH PLATE WITH
FLEXIBLE CENTER
Richard Binder and Peter Geibel, Schweinfurt, Germany, assignors to Fichtel & Sachs A.G., Schweinfurt, Germany
Filed Nov. 16, 1966, Ser. No. 594,855
Claims priority, application Germany, Nov. 20, 1965,
F 47,732
2 Claims. (Cl. 192—106.2)

ABSTRACT OF THE DISCLOSURE

The driven member of an automotive friction clutch has a hub attached to the clutch disc by vibration absorbing springs which resiliently resist angular displacement of the disc relative to the hub, and by lost motion connections which directly transmit torque between the hub and disc at a desired maximum deformation of the springs to relieve the latter of the transmitted force.

---

This invention relates to friction clutches of the automotive type, and particularly to an improved driven clutch plate having a flexible center.

It is known to provide the driven member of a friction clutch in a vehicle propelled by a reciprocating internal combustion engine with a flexible center to absorb torsional vibration of the crankshaft which would otherwise be transmitted to the power train. The flexible center includes steel compression springs placed between the hub of the clutch plate and the disc which carries the friction facings. The springs permit the but to rotate slightly relative to the disc until the springs are fully compressed and constitute abutments which prevent further relative motion. As the transmitted torque decreases, the springs expand and the hub and disc are displaced angularly in opposite directions.

It is also known from the French Patent No. 1,389,604 to provide a clutch plate with two vibration absorbing elements with different elastic properties of which one is intended to absorb vibrations during normal operation of the engine while the power of the engine is transmitted to the wheels, whereas the other vibration absorbing element is intended to absorb vibrations during idling of the engine when the multiple speed transmission normally interposed between the friction clutch and the wheels disengages the engine from the wheels. The known clutch plates intended to suppress noise due to vibration during idling of the engine have not been fully satisfactory.

The primary object of the invention is the provision of a clutch plate having two vibration absorbing elements which are effective both during normal vehicle-propelling operation of a reciprocating engine and during idling when the transmission is set in the neutral position.

Another object is the provision of a clutch plate meeting the above requirements which is simple and rugged in its construction.

It has been found that one of the two vibration absorbing elements must meet two critical design criteria to be effective during idling of the associated engine. The angular displacement between the input and output member of the element must not exceed 14°, and the spring characteristic of the element when expressed in units of torque per unit of the afore-mentioned angular displacement must not exceed 0.5 kilogram meter per degree of angle. The spring characteristic of the second vibration absorbing element may vary between somewhat wider limits of 1.5 kilogram meters per degree and 70 kilogram meters per degree, depending on the required result. A spring characteristic of 1.5 to 10 kilogram meters is effective in passenger cars, the range from 10 to 70 kilogram meters per degree being appropriate in trucks and similar vehicles.

The vibration absorbing elements are provided with damping elements which offer frictional resistance to the transmission of torque between the input and output members of each element. The frictional resistance in the first-mentioned element must not be greater than 0.3 kilogram meter in passenger cars, nor greater than 1 kilogram meter in trucks. The frictional resistance of the second vibration absorbing element should be between about 0.5 and 2 kilogram meters in passenger cars and between 3 and 20 kilogram meters in trucks.

Other features, additional objects, and many of the attendant advantages of this invention will become apparent from the following detailed description of preferred embodiments when considered in connection with the appended drawings in which.

Figure 1:
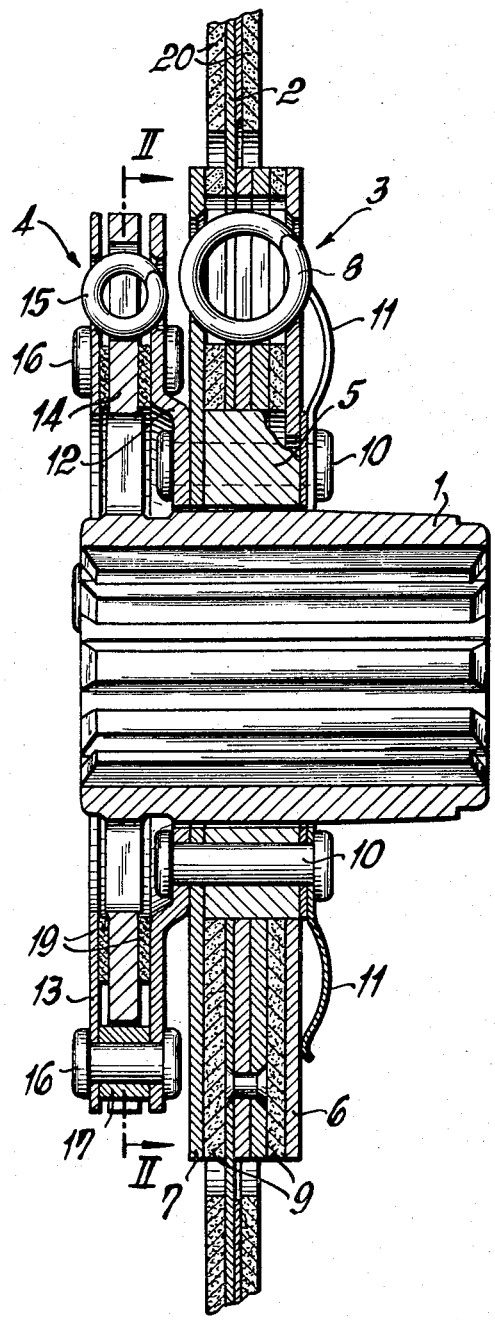
FIGURE 1 shows a driven clutch plate of the invention in axial section on the line I—I in FIGURE 2.
Figure 2:
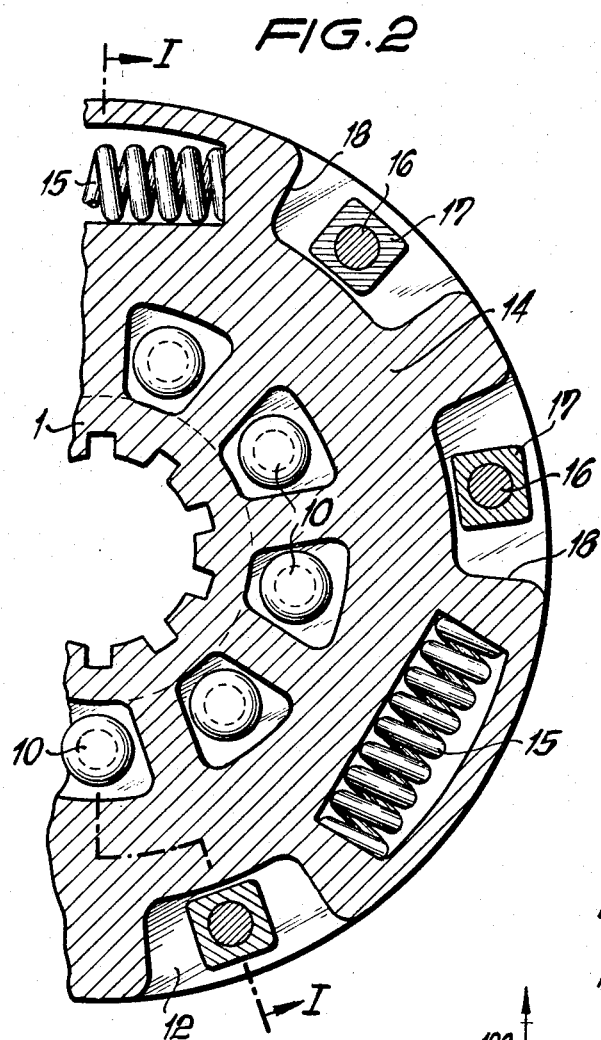
FIGURE 2 shows a portion of the device of FIGURE 1 in section on the line II—II.

Referring now to the drawing in detail, and initially to FIGURES 1 and 2, there is seen a clutch plate equipped with an internally splined tubular hub 1 which normally engages a clutch shaft connected to the multiple-speed transmission of an automotive vehicle. The plate has a flat, annular steel disc 2 coaxial with the hub 1 which carries friction facings 20 on its opposite radial faces, as is conventional. Two vibration absorbing elements 3, 4 are interposed in series between the hub 1 and the disc 2.

The first element 3 has an annular hub portion 5 which is freely rotatable on the hub 1. An annular cover plate 7 is fixedly attached to the hub portion 5, the hub portion 5 and plate 7 constituting the output assembly of the element 3. The input assembly of the element consists of flat rings riveted to the disc 2, and of an integral portion of the disc radially coextensive with the rings. The input assembly is covered with rings of friction material 9 similar to that of the facings 20. The input assembly is urged axially against the cover plate 7 by a loose flange 6 and a spring 11. Bolts 10 fasten the hub portion 5, the cover plate 7, and the spring 11 to each other and to a dished sheet metal ring 12 which is one of the input members of the second vibration absorbing element 4.

The afore-mentioned input assembly of the element 3, the rings 9, the cover plate 7, and the loose flange 6 are each formed with three openings therein which are elongated in a tangential direction relative to a circle or cylinder about the clutch axis, and in which helical compression springs 8 are received. The openings are axially aligned when the springs 8 are in their most relaxed condition. When the input and output assemblies are angularly displaced relative to each other, the interposed springs 8 are compressed.

The second vibration absorbing element 4 is similar to the element 3. The input assembly of the element 4 includes, in addition to the afore-mentioned ring 12, a cover plate 13 of resilient material, and spacers 17 axially secured between the peripheral portions of the ring 12 and the plate 13 by bolts 16. The cover plate 13 is dished when in the relaxed position, and is resiliently deformed in the illustrated assembled condition by abutting axial engagement with annular friction plates 19 which are interposed between the input assembly of the element 3 and a radial flange 14 integral with the hub 1 which is the output member of the element 4.

As best seen in FIGURE 2, the periphery of the flange 14 is notched, and the spacers 17 are received in the notches 18 with sufficient play to permit relative angular displacement of the input assembly of the element 4 relative to the flange 14 through an angle of about 8 degrees in either direction from the illustrated normal or inoperative position in which the element 4 is held by three helical compression springs 15 whose axes are approximately tangential to a common circle about the clutch axis.

Respective axially coextensive portions of the springs 15 are received in normally aligned openings of the input assembly, the friction plates 19, and the flange 14 in the manner described with reference to the element 3. The springs 15 are much weaker than the springs 8. They further differ from the springs 8 by being as long as the receiving openings in the input assembly and in the flange 14 of the element 4, whereas two of the springs 8 are shorter than the associated openings of the element 3 in the fully relaxed condition of the springs 8, as will be shown in FIGURE 6.

Figure 3:
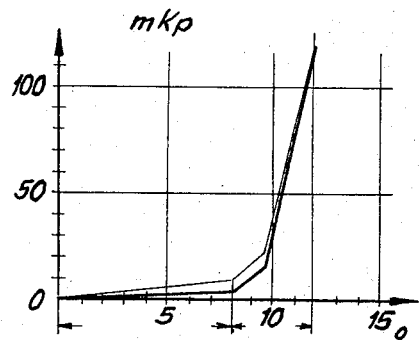
FIGURE 3 is a diagram of the spring characteristic of the plate of FIGURE 1.

The resulting mode of operation of the clutch plate of FIGURES 1 and 2 is evident from FIGURE 3 which graphically illustrates the spring characteristics of the clutch plate. The abscissa is calibrated in degrees of relative angular displacement of the disc 2 and hub 1 while the ordinate is calibrated in units of torque (kilogram meter) applied to the clutch.

As long as the displacement does not exceed about 8°, the strong springs 8 prevent relative movement of the input and output assemblies of the first vibration absorbing element 3, and the line representing the spring characteristic of the plate slopes gently. This portion of the line constitutes, in effect, the characteristic of the second element 4 alone. When the displacement of the hub 1 and disc 2 exceeds 8°, the spacers 17 abut against the flange 14 in the notches 18, and thereby prevent further relative angular displacement of the input and output assemblies of the element 4. The steeper portions of the characteristic in FIGURE 3 thus reflect solely the elastic properties of the element 3.

The slope of the characteristic is less steep between 8° and 10° than between 10° and 12°. The shallower slope of the transition portion is due to the fact that only the longest spring 8 is initially effective in resisting torsional deformation of the element 3, and that all three springs 8 are effective only during stronger displacement. All springs 8 are fully compressed at a displacement of 12° and thereby limit further torsional deformation of the element 3.

The characteristics of the clutch plate shown in FIGURE 3 make the clutch plate suitable for use in a truck. The softer springs necessary for adapting the clutch plate to use in passenger cars within the criteria set forth above will readily be selected by those skilled in the art.

Figure 4:
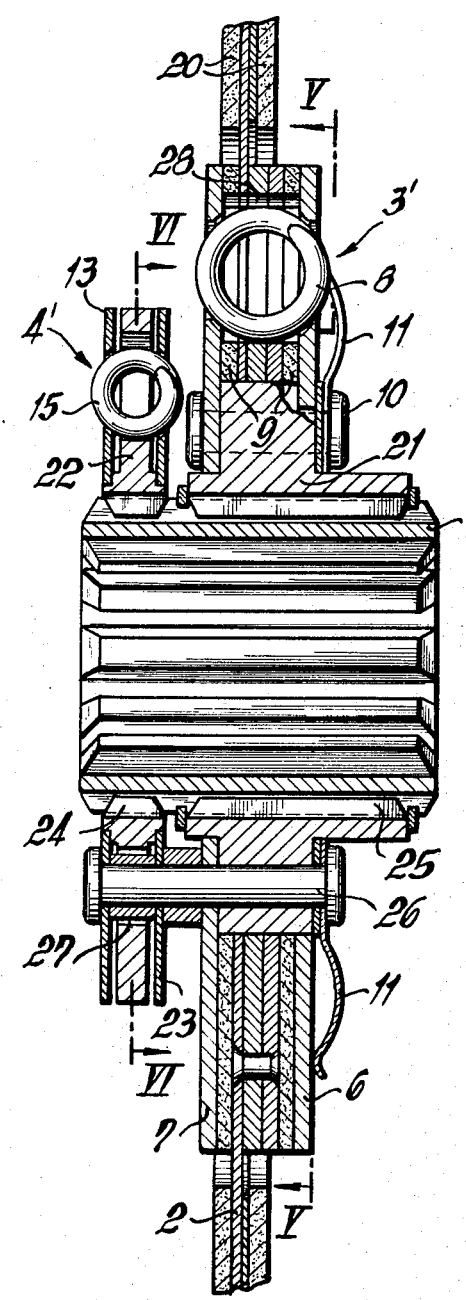
FIGURE 4 shows a modified clutch plate of the invention in a view corresponding to that of FIGURE 1.
Figure 5:
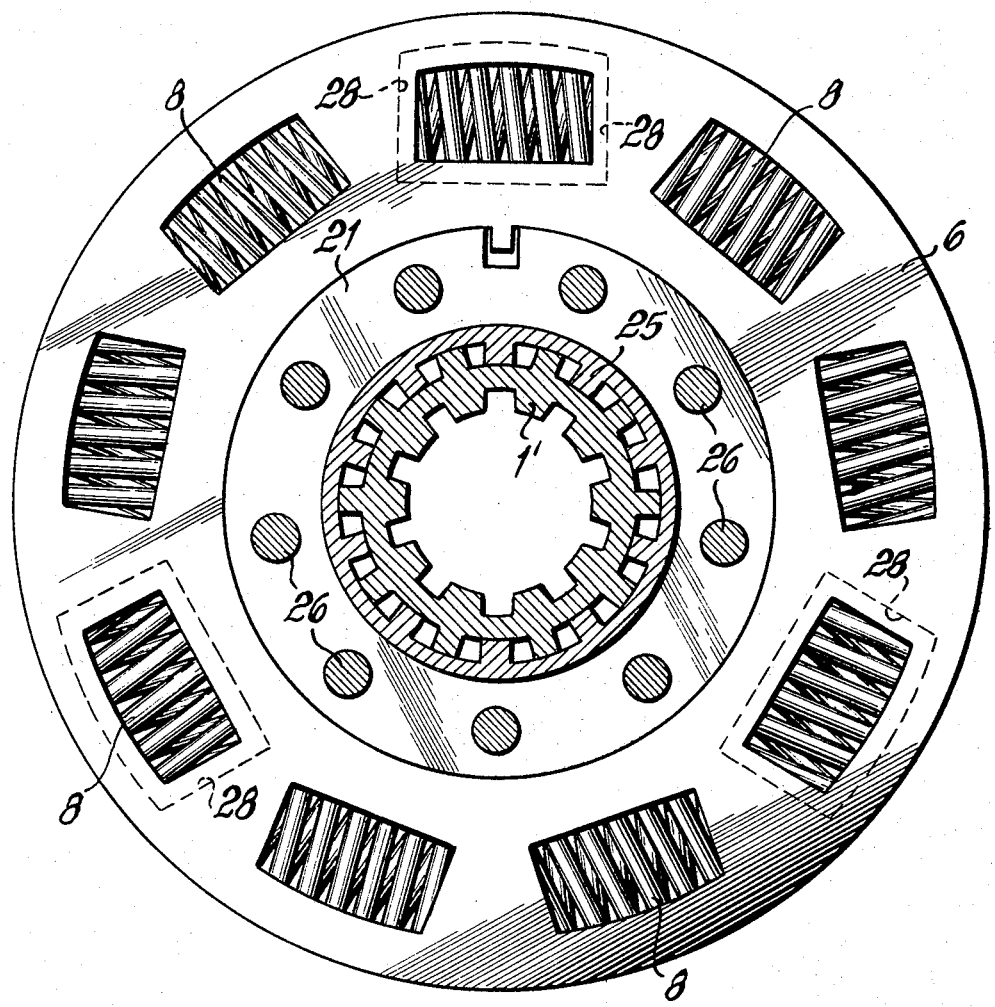
FIGURES 5 and 6 show portions of the plate of FIGURE 4 in section on the lines IV—IV and V—V respectively.
Figure 6:
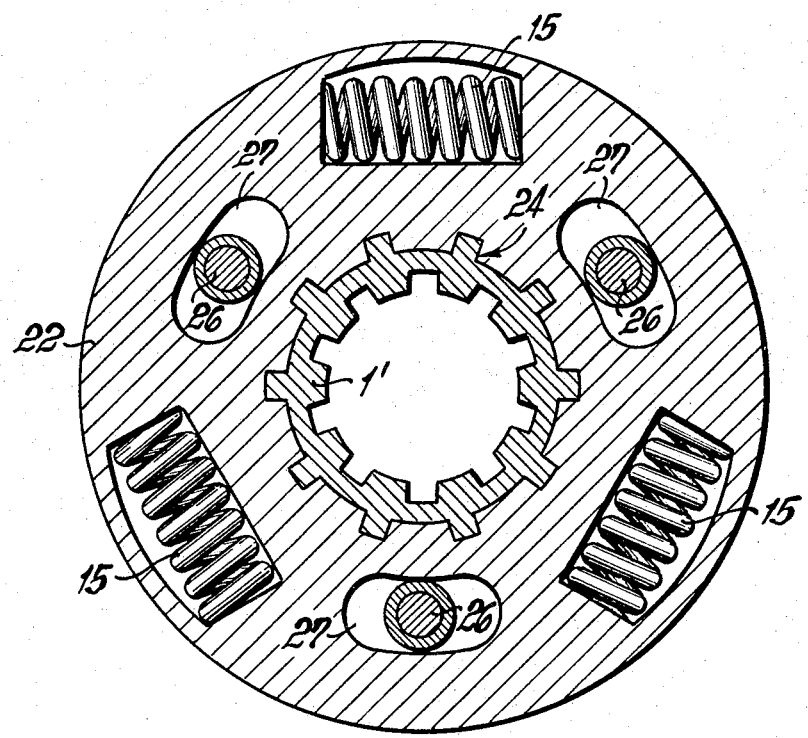

The clutch plate illustrated in FIGURES 4 to 6 is similar to that described with reference to FIGURES 1 and 2, and its characteristic is adequately shown in FIGURE 3.

The modified plate has a tubular hub 1' which is internally splined and provided with axial ribs 24 on its outer, otherwise cylindrical surface. The hub portion 21 of a first vibration absorbing element 3' has internal axial ribs 25 which define there-between grooves receiving the ribs 24 of the hub 1', and are themselves received in grooves between the ribs 24, the circumferential dimensions of the ribs 24, 25 and of the associated grooves being such as to permit limited relative rotation of the hub portion 21 relative to the hub 1' so that the ribs 24, 25 constitute a lost-motion coupling.

The other elements of the element 3' are identical with the corresponding elements of the clutch plate of FIGURE 1, and have been provided with the same reference numeral. The disc 2 is attached to the element 3' as described above with reference to the element 3.

The hub portion 21, which is the output member of the element 3' is fastened to the input assembly of the second vibration absorbing element 4' by a lost motion connection, the lost motion of the connection in terms of angular displacement about the clutch axis being greater than the lost motion between the ribs 24, 25 of the hub 1' and of the hub portion 21.

As best seen in FIGURE 6, when taken with the lower portion of FIGURE 4, bolts 26 fixedly fastened to the hub portion 21 are free to move to a limited extent in a circumferentially elongated opening 27 of a flange 22 which is secured against rotation on the hub 1' by conforming engagement of the ribs 24 on the hub 1' with grooves on an inner face of the flange 22.

The bolts 26 fixedly fasten the output assembly of the element 3', namely the flange portion 21 and the cover plate 7 to the spring 11 and to the input assembly of the element 4' which mainly consists of a cover plate 13 and a ring 23 spaced in opposite axial directions from the flange 22. Springs 15 are received in tangential recesses of the flange 22, of the plate 13, and of the ring 23 to provide the desired soft spring characteristics of the element 4' during idling of a connected engine, and until the capacity of the element 4' is exceeded by the transmitted torque. Direct abutting engagement of the bolt 26 against the flange 22 in the openings 27 then relieves the resilient parts of the element 4' from further load transmission.

As best seen in FIGURE 6, the element 3' is provided with seven compression springs 8 of which three are received in oversized openings 28 in the input assembly of the element so that they may move through a small angle with the loose flange 6 and the cover plate 7 before abuttingly engaging the flange disc 2. The other four springs 8 are contiguously interposed between the input and output assemblies of the element 3' at all times, and provide the relatively shallow slope of the spring characteristic during transition from idling to normal drive operation evident from FIGURE 3. Such a relatively gradual transition contributes greatly to the comfort of the occupants of a car.

During operation of the clutch plate shown in FIGURES 4 to 6, the element 3' acts as a practically rigid unit which transmits torque from the clutch disc 2 to the unit 4' by means of the bolts 26 until the ribs 24, 25 abuttingly engage each other, whereupon greater torque is transmitted directly from the element 3' to the hub 1'. The torsional deformation of the element 3' is limited by axial abutment of the turns in the springs 8.

It should be understood, of course, that the foregoing disclosure relates only to preferred embodiments of the invention, and that it is intended to cover all changes and modifications in the examples of the invention herein chosen for the purpose of the disclosure which do not constitute departures from the spirit and scope of the appended claims.

What is claimed is:

1. In a driven member for a friction clutch having a hub member, said hub member having an axis, an annular clutch disc member extending about said axis, two vibration absorbing elements interposed in series between said members for transmitting torque between the same when the disc member is being rotated about said axis, each element having an input member, an output member rotatable relative to the input member about said axis, resilient means interposed between said input and output members for resisting relative angular displacement of said input and output members with a torque which increases with increasing displacement, and abutment means for limiting the angular relative displacement of said input and output members, wherein:

(a) the abutment means of one of said vibration absorbing elements limit the relative displacement of the input and output members of said one vibration absorbing element to an angle of not more than fourteen degrees;
(b) the resilient means interposed between the input and output members of said one vibration absorbing element have a spring constant of not more than 0.5 kilogram meter per degree of said angle;
(c) the resilient means interposed between the input and output members of the other vibration absorbing element have a spring constant of 1.5 to 70 kilogram meters per degree of relative angular displacement of the input and output members of said other element;
(d) the output member of said one vibration absorbing element being secured to said hub member against relative rotation;
(e) lost motion coupling means connecting the output member of said other vibration absorbing element to said hub member for limited relative rotation; and
(f) fastening means securing the input member of said one element to the output member of said other element,
    (1) said coupling means including the abutment means limiting the relative angular displacement of the input and output members of said one element,
    (2) the input member of said other element being fastened to said disc member,
    (3) said fastening means including lost motion means, the lost motion of said fastening means being greater than the lost motion of said coupling means.

2. In a driven member as set forth in claim 1, said fastening means including a bolt member axially extending between said input member of said one element and said output member of the other element, the output member of said one element being formed with an axial opening therethrough, the opening receiving said bolt member and being dimensioned to permit circumferential movement of said bolt member in the opening.

References Cited

UNITED STATES PATENTS

| | | |
|---|---|---|
| 2,029,339 | 2/1936 | Reed. |
| 3,091,949 | 6/1963 | Sink. |
| 3,101,600 | 8/1963 | Stromberg. |
| 3,138,011 | 6/1964 | Stromberg. |
| 3,280,949 | 10/1966 | Ross. |

BENJAMIN W. WYCHE III, *Primary Examiner.*